D. LANE.
Head-Blocks for Saw-Mills.
No. 136,656. Patented March 11, 1873.
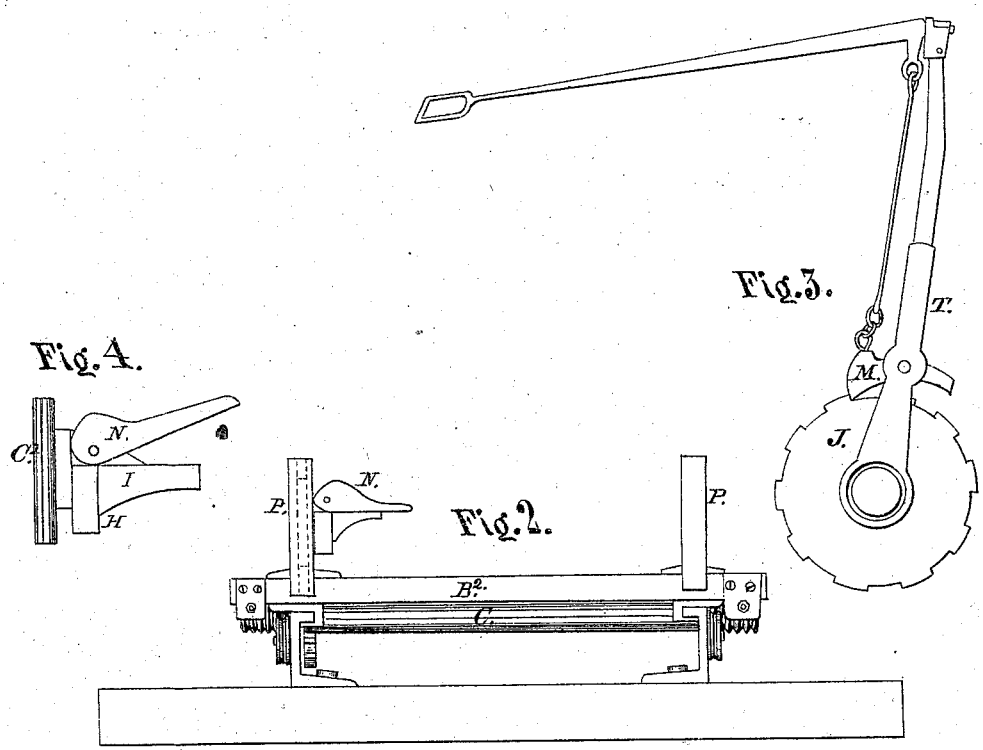
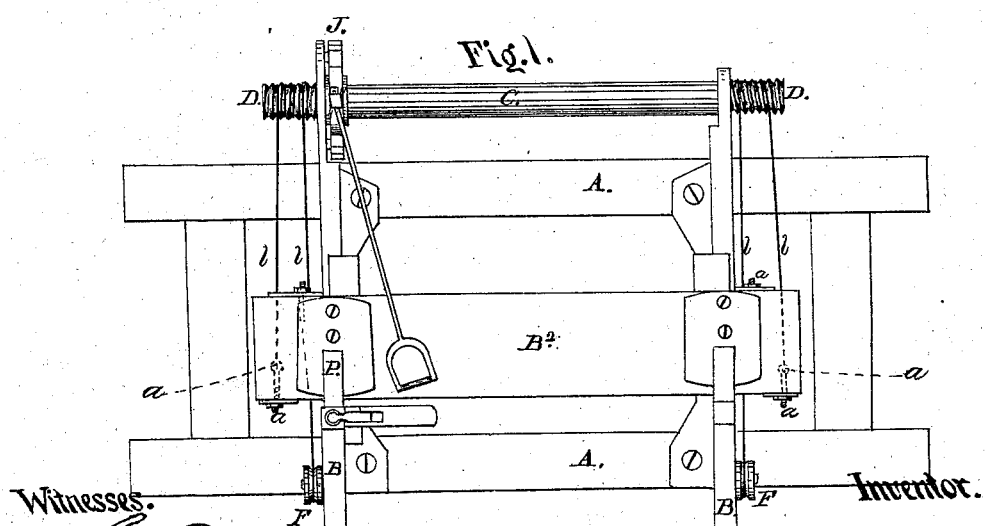
Witnesses. Inventor.
Dennis Lane

UNITED STATES PATENT OFFICE.

DENNIS LANE, OF MONTPELIER, VERMONT, ASSIGNOR TO HIMSELF, PERLY P. PITKIN, AND JAMES W. BROCK, OF SAME PLACE.

IMPROVEMENT IN HEAD-BLOCKS FOR SAW-MILLS.

Specification forming part of Letters Patent No. 136,656, dated March 11, 1873.

*To all whom it may concern:*

Be it known that I, DENNIS LANE, of Montpelier, in the county of Washington and State of Vermont, have invented certain Improvements in Head-Blocks for Saw-Mills, of which the following is a specification:

Nature and Objects of the Invention.

My invention consists in combining with the lateral upright supports sliding-dogs, combined with frictional cams for locking the dog when driven into the log, so that they cannot recede or slip out of the log.

Description of the Drawing.

Figure 1 is a plan or top view of my invention. Fig. 2 is a front elevation of a part of the same. Fig. 3 is an end view of a detached part, consisting of ratchet, setting-lever, dog, set-handle, and connecting-rod. Fig. 4 is a sliding dog that slides up and down on the upright supports P P.

Similar letters of reference indicate corresponding parts in the drawing.

General Description.

A A represents the saw-mill carriage, which may be of any of the usual forms of construction. B B represent bearings for the logs to rest upon, the number of which may be either more or less, according to the length of the carriage across which they extend. C is a setting-shaft extending parallel with the sides of the carriage A A, attached to the back of ends of the bearings B B, and operated by a ratchet, J, dog M, and lever T, or may be operated by a lever from the back side of the carriage. On this setting-shaft C are drums D D, which are grooved or screw-threaded for the cord or chain to wind in. $B^2$ is a set-beam or sliding bar extending parallel with the carriage-sides A A. F F are grooved pulleys attached to the front ends of the bearings B B. $l\,l$ are cords or chains fastened to the middle of the drums D D on opposite sides, and wound around a sufficient number of times to move the set-beam by friction across the width of the carriage, as shown in Fig. 1. One of these cords or chains at each end of the set-shaft is passed around the pulleys and attached to the set-beam for the purpose of moving it forward; the other ends pass directly from the drums to the set-beam for the purpose of drawing it back. The set-beam is provided with staples and nuts for the purpose of tightening the cords or chains to properly adjust the set-beam.

These cords may be made up of any non-elastic material; or a wire cable, or a perforated chain may be used, the pulleys being spurred to correspond with the perforations in the chain. In practice, a small wire cable will, it is believed, be both sufficient and permanent for the purpose.

P P are upright supports for the log to rest against, which have a dog, H, that slides up and down in a groove in the supports. This dog consists of the dog proper H, the shank $C^2$ that slides in the groove, the projection I and frictional cam N, as shown in Fig. 4. This dog can be made to slide in a groove as shown, or the recess can be in the shank to slide on a projection on the side of the support. The eccentric cam can be made to bind by raising the handle, as shown, or it can be made to swing around sidewise in order to lock the dog, when driven into a log, to the support, and prevent its working out. These dogs can be made to project in front any desired distance, and when raised up can be swung around out of the way of the saw, or fastened at the top of the support with the cam.

Any number of these supports and dogs may be used, according to the length of the carriage.

The advantage of this locking device over the device shown in my former inventions is, first, there is a less number of pieces to wear and get out of order; second, the cam takes up all of the lost motion and prevents the dog from working loose while being used.

The upright supports P P are secured to the set-beam on the upper side, and there are plates secured to the under side provided with lips to lock under flanges on the bearings B B to hold it in place while being moved to and fro on the carriage.

This set-beam can be dispensed with if desired, and the knees made to slide on the bearings B B, and the chains attached to the knees for the purpose of moving them forward and back.

It will be seen that by running the upright supports back a log can be rolled onto the bearings B B, against the upright supports P P, and dogged with the sliding dog H or other dogs, such as shown in my former patents. Then by drawing the handle attached to the setting-lever T forward, the shaft C is turned, causing the cords or chains that run around the drums F to wind up around the drums D, and the other cords or chains to unwind, thereby causing the upright supports and log to be moved up to the saw upon the carriage.

I claim—

In combination with the log-rests P of a saw-mill carriage, a dog, H, having combined therewith an eccentric cam-lever, N, for locking the dog upon the rest P, constructed and operated substantially as shown and described.

DENNIS LANE.

Witnesses:
C. A. DURGIN,
E. H. JOHNSON.